United States Patent [19]

Coviello

[11] 4,072,818
[45] Feb. 7, 1978

[54] SYSTEM FOR CONVERTING TONAL IMAGES TO LINE DRAWINGS

[75] Inventor: John W. Coviello, Owings Mills, Md.

[73] Assignee: Westinghouse Electric Corporation, Pittsburgh, Pa.

[21] Appl. No.: 585,641

[22] Filed: June 10, 1975

[51] Int. Cl.² ............................................. H04N 7/13
[52] U.S. Cl. .................................... 358/284; 358/96; 358/167; 358/302
[58] Field of Search ............... 178/DIG. 12, DIG. 39, 178/6, 5, DIG. 3, DIG. 34

[56] References Cited

U.S. PATENT DOCUMENTS

| | | | |
|---|---|---|---|
| 3,249,690 | 5/1966 | Schubert | 178/6.8 |
| 3,472,950 | 10/1969 | Izumi et al. | 178/6.6 |

Primary Examiner—Robert L. Griffin
Assistant Examiner—Edward L. Coles
Attorney, Agent, or Firm—J. B. Hinson

[57] ABSTRACT

A device for substantially instantaneously converting a tonal image, such as a photograph, to a line drawing which depicts the lines formed by the borders of contrasting portions of the tonal image. The tonal image is scanned by a video scanner to produce a time varying video signal which signal is then differentiated to produce a signal consisting of pulses representative of predetermined selected levels of changes in tone, color, or shade. The signal is supplied to a pulse generator which produces a pulse of uniform width and height for each input pulse suitable for processing by a video receiver. The video receiver, being synchronized with the video scanner, is provided with means to instantaneously display a line drawing of the tonal image. Circuit control means are also provided to vary the uniform width of the lines in the resulting line drawing and to control the selection of lines in the line drawing in accordance with its corresponding significance in the tonal image.

6 Claims, 12 Drawing Figures

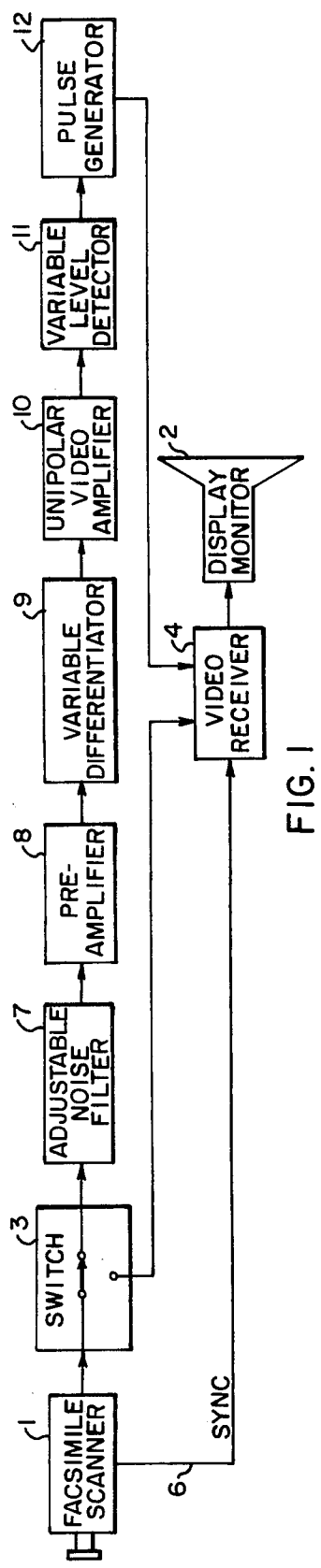
FIG. 1
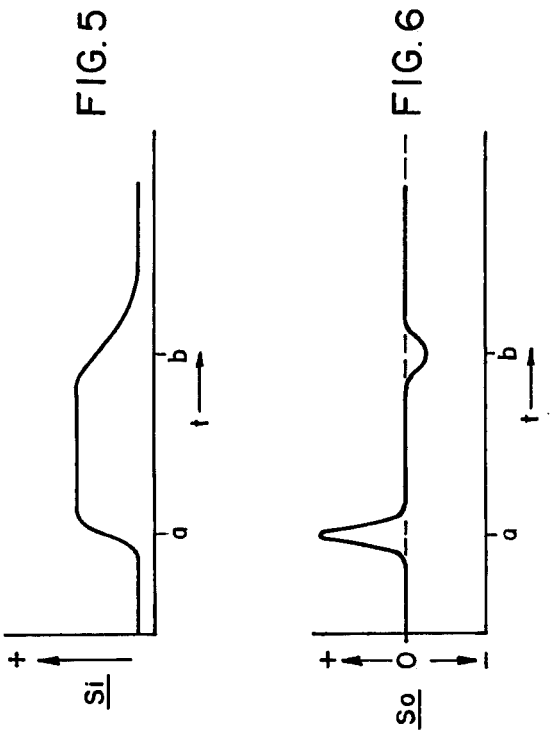
FIG. 5
FIG. 6
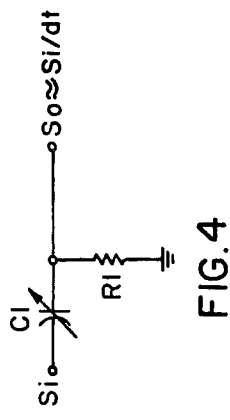
FIG. 4

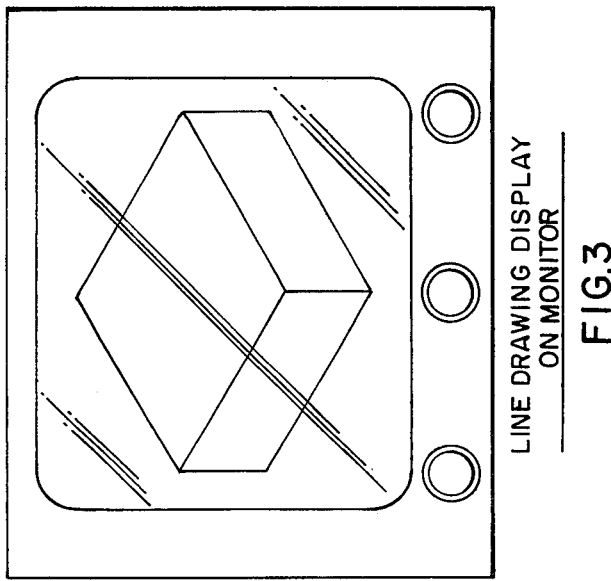
FIG.3 LINE DRAWING DISPLAY ON MONITOR
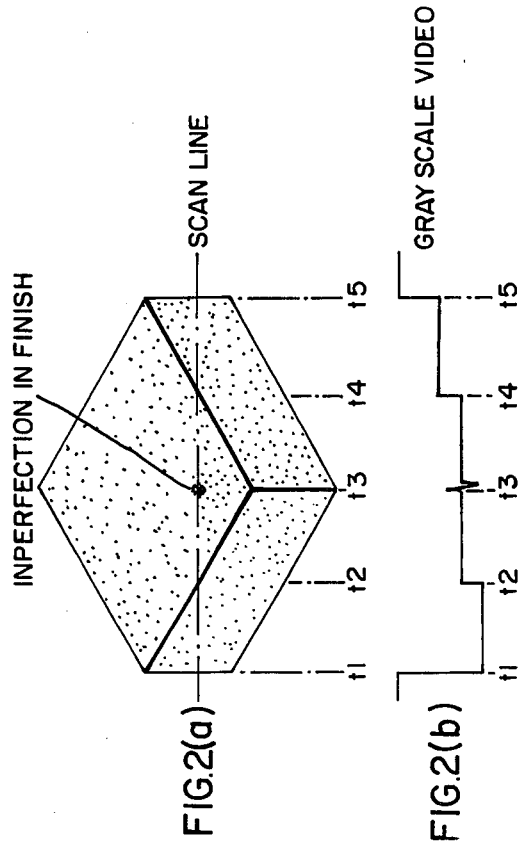
FIG.2(a) SCAN LINE / INPERFECTION IN FINISH
FIG.2(b) GRAY SCALE VIDEO
FIG.2(c) DIFFERENTIATED VIDEO
FIG.2(d) UNIPOLAR VIDEO / THRESHOLD LEVEL SET BY LEVEL DETECTOR
FIG.2(e) MULTIVIBRATOR OUTPUT
FIG.2(f) MONITOR SCAN LINE

SYSTEM FOR CONVERTING TONAL IMAGES TO LINE DRAWINGS

CROSS REFERENCES TO RELATED APPLICATIONS

So far as known, this application is not related to any pending applications or patents.

BACKGROUND OF INVENTION

This invention relates to an electronic signal processing system together with a video scanner and receiver for producing a line drawing from a tonal image having various tones, colors, or shades.

Frequently, there is a need to reproduce manuals having line drawing illustrations wherein the line drawings are representative of photographs or other pictures having various shades or tones. For example, it is a common practice to photograph prototypal setups or laboratory arrangements to provide a pictorial illustration of the same in technical manuals, patent applications, or the like. For the purpose of conveniently reproducing such illustrations, a line drawing is desired. This invention is concerned with a system for facilitating an artist in converting such photographs into line drawings and eliminating the extent of his manual labor required during the conversion process.

In the prior art, many systems have been developed to convert images to line drawings for various other purposes, such as to improve video communications or object detection. These systems usually include an electro-optical device for scanning an image or photograph in a manner similar to the method used in standard television cameras, signal processing means to process the video signal from the electro-optical scanning device, and a video receiver and display monitor for receiving the processed signal and displaying a facsimile of the scanned image or photograph. The signal processing means employed by these systems may utilize principles of density slicing, delayed cancellation, or differentiation of a video signal to produce a pulse signal therefrom wherein said pulses represent changes in level of the video signal as the image is scanned thereby providing means to detect significant lines in the tonal image. This invention is associated with the last mentioned technique, which provides a fast, cheap and convenient means of converting tonal images to line drawings.

PRIOR ART

The method of delayed cancellation is shown in U.S. Pat. No. 3,361,872 issued to Sweeney wherein two replicas of a tonal image to be converted to a line drawing are displaced and compared point by point. A corresponding point in the line drawing is produced only when there is a difference in the level of intensity between the corresponding points on the replicas. This method of producing line drawings from tonal images requires very complex and expensive processing circuits.

Another commonly used method of converting tonal images to an image similar to a line drawing is density slicing, as disclosed by U.S. Pat. No. 3,617,631 issued to Soames. The resulting image is a silhouette which represents the portions of the tonal image having a predetermined density or intensity level. The most likely purpose in utilizing this method would be to depict outlines of images in camouflaged or low contrast surroundngs to facilitate object detection.

U.S. Pat. No. 3,249,690 issued to Schubert discloses a signal processing circuit which produces a first derivative pulse and second derivative pulse from a signal produced by a video scanner wherein the simultaneous coincidence of the two pulses defines a point in the resulting line drawing, however, the slow signal processing circuits required for generating first and second derivatives by active differentiators do not provide the convenient and instantaneous production of a line drawing for reproduction as disclosed by applicant's invention.

SUMMARY OF INVENTION

As will be subsequently more fully explained in detail, the invention disclosed herein defines a system for converting tonal images to line drawings wherein a high frequency video signal produced by a video scanner is first processed by a series of processing circuits which generate a signal consisting of pulses of uniform width and height from the approximate first derivative of said video signal and, secondly, received by a video receiver having display means to selectively display the tonal image as viewed by the video scanner or a line drawing thereof. The scanning and signal processing are performed rapidly to substantially instantaneously display a line drawing on a display monitor, such as a cathode ray tube, thereby allowing an operator to make immediate adjustments to the scanning and processing circuitry based upon an instant visual observation of the line drawing prior to reproduction by conventional means. Accordingly, significant time savings in acquiring the desired line drawing suitable for reproduction is accorded.

The processing circuits of the invention are provided with various control means to improve the quality of the resulting line drawing. In the preferred embodiment of the invention, an adjustable noise filter is interposed in the signal processing path before a differentiator and is adapted to be manually adjusted to remove any grain noise or imperfections which may exist in the photograph or tonal image as viewed by the facsimile scanner. Additionally, the processing circuit which performs the differentiation consists of passive circuit elements and is adapted to be adjustably responsive to the high frequency video signal so that the system may be operable with various modes of images and their concommitant contrast quality. For example, the system may be adapted to produce line drawings of sharply focused images while not being responsive to out of focus images such as shadows or glare.

Other features of the preferred embodiment include means to select the lines of the line drawing in accordance with its corresponding significance in the tonal image by manual adjustment of a level detector to discriminate against pulses from the differentiator, means to produce lines of uniform width in the line drawing by the provision of a single shot multi-vibrator driven by pulses from the level detector, means to vary the uniform width of the lines in the line drawing by the provision of means to control the width of pulses emanating from the single shot multi-vibrator, and means to selectively display the line drawing or the tonal image on the display monitor to facilitate focusing and operation by an operator by the provision of a switch to connect the video signal from the scanner directly to the video receiver or the processing circuitry.

In view of the foregoing, the primary purpose of applicant's invention is to substantially instantaneously produce a line drawing from a tonal image without the attendant delay in signal processing inherent in prior art systems.

Additionally, another object of the invention is to provide manually adjustable signal processing control means in the system to improve the quality of the resulting line drawing.

Another object of the invention is to provide circuit control means to select the lines to be displayed in the line drawings in accordance with its corresponding significance in the tonal image.

Another object of applicant's invention is to provide means to generate uniform and controllable width lines in the resulting line drawing.

Other objects and advantages of the invention will become readily apparent upon the following description and operation of applicant's invention.

BRIEF DESCRIPTION OF DRAWINGS

FIG. 1 shows a block diagram of the entire system for converting a tonal image to a line drawing.

FIG. 2(a) shows a tonal image and an arbitrary line of scan of a facsimile scanner.

FIG. 2(b) shows a graph of the video signal level produced by a facsimile scanner when scanning the scan line of FIG. 2(a).

FIG. 2(c) shows a graph of the derivative of the signal of FIG. 2(b).

FIG. 2(d) shows a graph of the unipolar conversion of the signal of FIG. 2(c) and a dashed line representing an arbitrary threshold level set by a level detector.

FIG. 2(e) shows a graph of constant width and height pulses corresponding to the pulses of the signal of FIG. 2(d) which are above the arbitrary threshold level.

FIG. 2(f) shows a display monitor scan line depicting the points produced on the line in response to the pulses of the signal of FIG. 2(e).

FIG. 3 shows a line drawing as displayed on a display monitor of the tonal image of FIG. 2(a) as viewed by a facsimile scanner.

FIG. 4 discloses a detailed circuit diagram to carry out the functions of a differentiator consisting of passive elements.

FIG. 5 shows a graph of an arbitrary input signal to the circuit of FIG. 4.

FIG. 6 shows a graph of an output signal of the circuit shown in FIG. 4 in response to the input signal of FIG. 5.

DETAILED DESCRIPTION OF INVENTION

Figure 7:
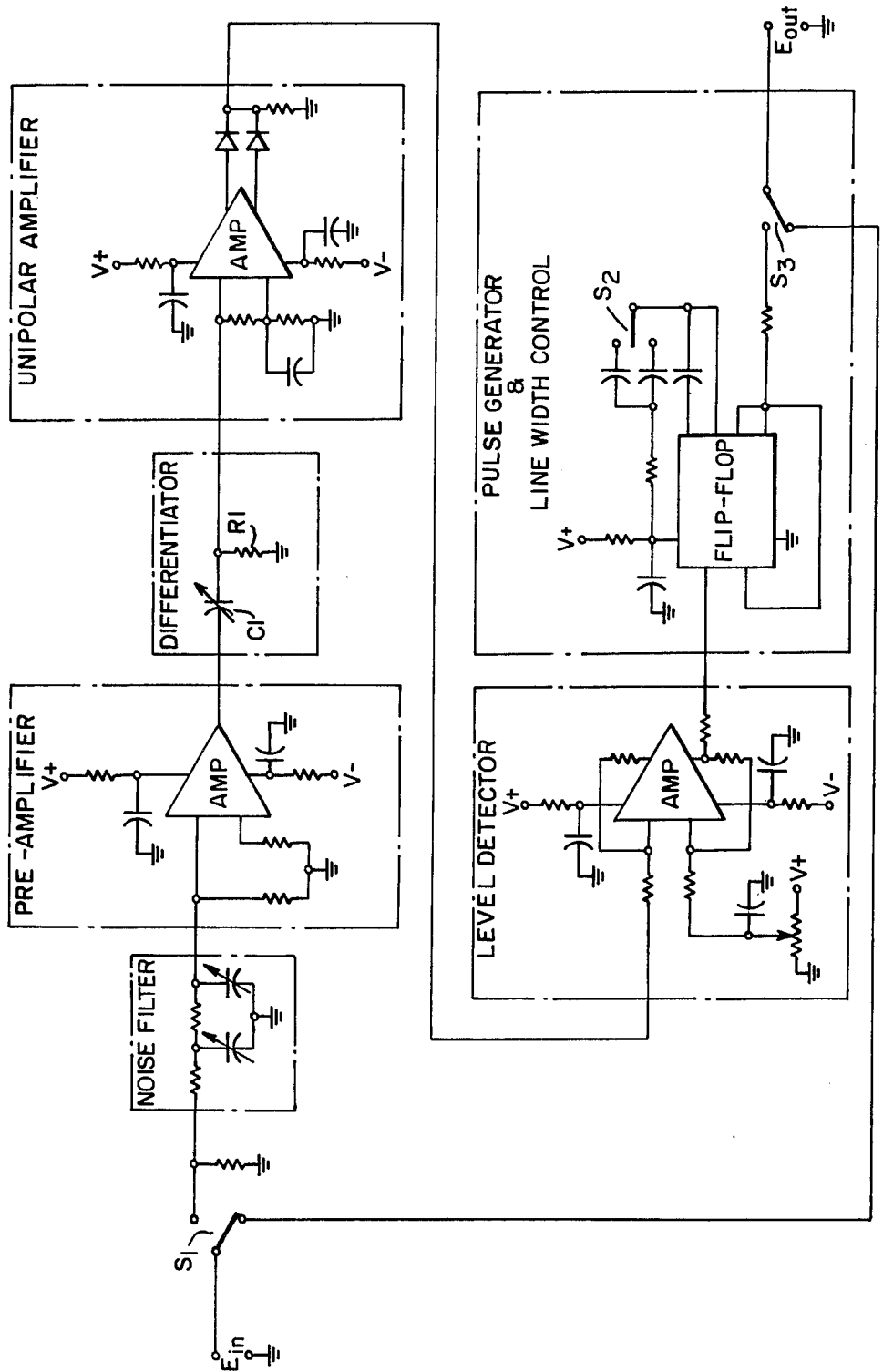
FIG. 7 discloses a detailed circuit diagram of the entire processing circuitry to carry out the functions of the invention.

For the purpose of this description, a tonal image is defined as including photographs, pictures, actual camera views of both two and three dimensional objects, and other similar images having various tones of colors, shades, or intensities.

A preferred embodiment of the invention is shown in block diagram form in FIG. 1. The diagram discloses a facsimile scanner 1 wherein a hard copy of a photograph or an actual view of a tonal image is viewed and scanned. The facsimile scanner generates a high frequency time varying video signal which is processed by elements 7 through 12 of the system which generates a signal suitable for video receiver 4 to display a line drawing of the viewed tonal image on display monitor 2. Facsimile scanner 1 and display monitor 2 may be conventional equipment as used in standard television broadcast and receiving systems. To facilitate arrangement and focusing of the tonal image to be converted, switch 3 is provided in the output signal path of facsimile scanner 1 to selectively switch the video signal between the signal processing circuit elements 7 through 12 and the video receiver 4 to either display the tonal image as viewed by the facsimile scanner 1 or a line drawing thereof. A synchronization line 6 is provided between the facsimile scanner 1 and the video receiver 4 to synchronize the timing of the scanning and display circuits.

When the switch 3 is set to the position shown which allows the video signal to be processed by processing circuit elements 7 through 12, an adjustable noise filter 7 first filters the video signal to remove any grain noise or imperfections which may exist in the tonal image or any other noise which may exist in the scanning system. Signals due to imperfections in the tonal image are generally higher in frequency than the normal video signals and, thus, they may be effectively filtered. As will become more readily apparent, an operator may manually adjust noise filter 7 and instantaneously observe the results of the adjustment in the displayed line drawing on display monitor 2 and then readjust, if necessary, to adapt the system to the various qualities of tonal images. The resulting signal is next processed by preamplifier 8 which amplifies the signal before being differentiated by the variable differentiator 9.

Variable differentiator 9 is adapted to be adjustably and substantially instantaneously responsive to the rate of change in the level of the time varying video signal emanating from preamplifier 8. The rate of change in signal level from preamplifier 8 is representative of changes in color, tone, shade or level of intensity of the tonal image as the image is scanned. Additionally, variable differentiator 9 produces a positive output pulse for each increase in level of its input signal and a negative output pulse for each decrease in level of its input signal which emanates from preamplifier 8. As will be subsequently more fully explained, the differentiation performed by differentiator 9 is accomplished by passive, instead of active, circuit elements to yield a substantially instantaneous approximation of the derivative of the video frequency input signal. According to the present state of the art, active differentiators may not be sufficiently responsive to high frequency video frequencies in excess of 125 megacycles, as required for the instantaneous production of line drawings. It should be noted that passive circuit components of differentiator 9 renders a close approximation of the derivative of the input signal, the accuracy of such approximation being sufficiently adequate for purpose of applicant's invention.

A unipolar amplifier 10 is then provided to operate on the signal from variable differentiator 9. The unipolar amplifier has a characteristic of producing an amplified pulse of a single polarity for both positive and negative input pulses from variable differentiator 9. The single polarity signal may also be provided by a passive circuit having no amplification. The signal from the unipolar amplifier 10 is next processed by variable level detector 11 wherein the output thereof consists of all pulses from unipolar amplifier 10 above a predetermined adjustable level. The adjustable level may be manually set by the operator in order to select the lines of the resulting line drawing in accordance with its corresponding significance in the tonal image. For example, the level may be adjusted such that only the lines corresponding to sharp and distinct boundaries of portions of the tonal image may be displayed while eliminating from the line drawing any lines which would otherwise appear corresponding to the less distinct boundaries or gradual transitions in color, shade, or tone. Level detector 11 may also be adjusted to a level slightly above the noise constituent of the signal to allow maximum sensitivity to edges in low contrast surroundings.

The signal from level detector 11 which consists of pulses above a predetermined level is then supplied to pulse generator 12 which generates an output signal consisting of pulses of constant magnitude and width suitable for being processed by video receiver 4. Pulse generator 12 may be a single shot multi-vibrator having trigger means wherein the pulses of the signal from level detector 11 are supplied thereto to generate one pulse of constant magnitude and width for each input pulse. Pulse generator 12 is also provided with control means wherein the operator may control the width of the output pulses thereby controlling the width of the lines in the line drawing displayed on the display monitor 2.

After having made all circuit adjustments as previously described, the line drawing, which is displayed on display monitor 2, may be reproduced by conventional means to acquire a hard copy thereof. One such means may be to photograph the line drawing from the display monitor. Another means to obtain a hard copy is to utilize a type of display monitor having associated therewith a video hard copy unit. Once the hard copy is obtained, a slight amount of refinement may be necessary to improve the appearance of the drawing and render it suitable for reproduction by simple means.

Referring now to FIGS. 2(a) through 2(f) and 3, a picture of a tonal image and its corresponding line drawing is shown, respectively. Shown sequentially in FIGS. 2(a) through 2(e) are graphs representing the signal at various positions in the signal processing system with corresponding points being labeled t1 through t5. The line of FIG. 2(a) indicates the direction of scanning by the facsimile scanner across the tonal image. The level of the video signal emanating from the facsimile scanner which corresponds to the scan line of the tonal image is shown by the graph in FIG. 2(b). As clearly illustrated, the level of this video signal is proportional to the brightness or intensity of the various portions of the tonal image. Low level pulses of very short duration may also be present in the video signal due to imperfection in the tonal image, however, they may be filtered by a noise filter as previously mentioned. The graph shown in FIG. 2(c) shows the output of the differentiator which consists of either a positive or negative pulse for each corresponding change in level of the signal emanating from the facsimile scanner as indicated in FIG. 2(b). The output of the unipolar amplifier is illustrated by FIG. 2(d) which corresponds to all pulses of FIG. 2(c), but having only a single polarity. The dashed line in FIG. 2(d) represents the threshold level set by the level detector wherein only those pulses above such level are supplied to the pulse generator to produce an output signal consisting of pulses of uniform width and height, as shown in FIG. 2(e). FIG. 2(f) shows the points of only one of several monitor scan lines corresponding to the pulse generator output signal. A scan of the entire tonal image will produce a line drawing thereof as shown in FIG. 3.

In order to describe more clearly the differentiation process, FIGS. 4, 5, and 6 are shown to disclose the details and operation of the passive circuit elements of differentiator 9 shown in FIG. 1. Input signal Si represents the output of preamplifier 8 and is characterized as being a filtered and amplified high frequency time varying video signal from the facsimile scanner. Output signal So, appearing across resistive element R1, represents an approximate first time derivative of input signal Si. The dynamic response of the circuit shown in FIG. 4 may be changed by varying capacitance Cl to alter the relationship between signals Si and So thereby providing means to adapt the system to tonal images having various focus and edge qualities. In operation, a change in the level of signal Si, as shown in FIG. 5, results in a flow of current through resistor R1 to generate output signal So which consists of pulses having magnitudes proportional to the rate of change in the level of input signal Si. The height of the pulse produced by the circuit can also be described as being proportional to the slope of signal Si at its respective point in time wherein a change in level occurs, and the polarity of the pulse produced by the circuit is dictated by the relative direction of change, that is, a positive or negative. For a constant signal level Si, the steady state response of the circuit is zero, as clearly shown by the graph in FIG. 6. The output signal So of FIG. 6 from the circuit is then supplied to a unipolar amplifier as previously hereinabove set forth.

FIG. 7 shows an example of several possible schematic diagrams of processing circuitry to carry out the functions of the instant invention. An input signal $E_{in}$ is supplied to the circuitry from facsimile scanner 1 of FIG. 1 and is fed directly to the output at $E_{out}$ or through the remainder of the processing circuitry via the noise filter according to the status of switches $S_1$ and $S_3$ which provides the means for generating a tonal image signal or line drawing to signal at $E_{out}$ to be supplied to a display monitor. The processing circuitry of FIG. 7 essentially comprises a concatenation of signal processing elements which include a noise filter, a preamplifier, a variable differentiator, a unipolar amplifier, a level detector, and a pulse generator having line width control means. It should be noted that the arrangement and nature of the individual processing elements may be changed to take on a variety of different forms without departing from the scope of the invention as herein described and claimed. Additionally, since it is obvious that many modifications, arrangements, and adaptions may be made to the entire system as disclosed herein by one ordinarily skilled in the art in accordance with the above teachings, it is not the intention of applicant to limit the invention to what is precisely described or claimed, but to include those numerous modifications, arrangements, and adaptions which may be so made.

What is claimed is:

1. A device for electronically and instantaneously converting a tonal image to a line drawing comprising, scanning means to scan said image and produce a time varying video signal representative of the level of intensity of said tonal image as the image is scanned, a passive differentiator responsive to said video signal for producing substantially instantaneously a first intermediate signal which consists of a pulse for each change in level of said video signal, said pulses being representative of the approximate first time derivative of the time varying signal and being positive for any increase in level and negative for any decrease in level, a unipolar amplifier to amplify said first intermediate signal and produce a second intermediate signal, said second intermediate signal consisting of amplified pulses of the same polarity corresponding to the respective ones of positive and negative pulses of said first intermediate signal, an adjustable level detector responsive to all pulses of said second intermediate signal which are above a predetermined adjustable level for producing a third intermediate signal, a pulse generator responsive to said third intermediate signal for producing an output signal consisting of a pulse of constant magnitude and width for each pulse of said third intermediate signal, and a video receiver having video display means responsive to said output signal for displaying a line drawing, said video receiver being synchronized with said scanning means, whereby a line drawing of a tonal image may be instantaneously displayed by a video receiver and the selection of lines in the line drawing in accordance with its respective significance in the tonal image may be instantaneously made by manually adjusting the level detector.

2. The invention as claimed in claim 1 wherein the passive differentiator is adjustably responsive to the rate of change in the level of said video signal whereby the device may be adapted to operate with various modes of images and their concommitant quality.

3. The invention as defined by claim 1 wherein means are provided to vary the width of the output pulses of the pulse generator whereby the uniform width of lines in the line drawing may be varied to acquire the desired line drawing.

4. The invention as defined by claim 1 wherein an adjustable noise filter and preamplifier respectively filter and preamplify the video signal before differentiation by the passive differentiator whereby lines due to grain noise and imperfections in the tonal image or noise generated by the facsimile scanner may be removed from the line drawing thereby enhancing the quality thereof.

5. The invention as defined by claim 1 wherein a manual switch is provided to alternately switch the video signal between the passive differentiator and the video receiver whereby either the line drawing may be displayed by the video receiver or the tonal image may be displayed by the video receiver for focusing purposes or the line drawing displayed.

6. A device for converting a tonal image to a line drawing comprising:
   a. scanning means for scanning said image to produce a time varying signal representative of the level of intensity of said tonal image as said image is scanned;
   b. means responsive to said time varying signal to produce a unipolar signal whose amplitude has a predetermined relationship to the rate of change of said time varying signal;
   c. means responsive to said unipolar signal for producing a pulsed signal comprising a plurality of pulses with a pulse of predetermind duration being produced whenever the amplitude of said unipolar signal exceeds a predetermined value; and
   d. means responsive to said unipolar signal to produce said line drawing.

* * * * *